US012041300B2

(12) United States Patent
Nilsson et al.

(10) Patent No.: US 12,041,300 B2
(45) Date of Patent: Jul. 16, 2024

(54) LOW LATENCY CONTENT DELIVERY

(71) Applicant: BRITISH TELECOMMUNICATIONS PUBLIC LIMITED COMPANY, London (GB)

(72) Inventors: Michael Nilsson, London (GB); Paul Farrow, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/915,264

(22) PCT Filed: Mar. 16, 2021

(86) PCT No.: PCT/EP2021/056619
§ 371 (c)(1),
(2) Date: Sep. 28, 2022

(87) PCT Pub. No.: WO2021/197832
PCT Pub. Date: Oct. 7, 2021

(65) Prior Publication Data
US 2023/0121792 A1      Apr. 20, 2023

(30) Foreign Application Priority Data
Mar. 30, 2020   (EP) ..................... 20166787

(51) Int. Cl.
*H04N 21/44*      (2011.01)
*H04L 65/613*     (2022.01)
(Continued)

(52) U.S. Cl.
CPC ..... *H04N 21/44004* (2013.01); *H04L 65/613* (2022.05); *H04N 21/845* (2013.01); *H04L 65/612* (2022.05)

(58) Field of Classification Search
CPC ..... H04L 65/613; H04L 65/612; H04L 65/70; H04L 65/80; H04L 43/0858;
(Continued)

(56) References Cited

U.S. PATENT DOCUMENTS 7,079,486 B2    7/2006   Colavito et al.
10,412,616 B1 * 9/2019   Butler ............... H04W 28/0226
(Continued)

FOREIGN PATENT DOCUMENTS

CN      102232298        11/2011
CN      104040992 A      9/2014
(Continued)

OTHER PUBLICATIONS

International Preliminary Report on Patentability dated Oct. 13, 2022 issued for International Application No. PCT/EP2021/056619 (8 pages).
(Continued)

*Primary Examiner* — John W Miller
*Assistant Examiner* — Akshay Doshi
(74) *Attorney, Agent, or Firm* — Nixon & Vanderhye P.C.

(57) ABSTRACT

The invention provides a method of media content delivery, where the time taken to deliver each chunk of content is measured, from which the stability or consistency of delivery times are calculated. The amount of data buffered at the user's device awaiting decoding and play-back can then be adjusted (such as by playing out the content slower or quicker), in order to achieve a good compromise between continuous play-out and low end-to-end delay, taking into consideration the current network characteristics.

21 Claims, 5 Drawing Sheets

(51) Int. Cl.
*H04N 21/845* (2011.01)
*H04L 65/612* (2022.01)

(58) Field of Classification Search
CPC ........... H04N 21/44004; H04N 21/845; H04N 21/44209; H04N 21/438
See application file for complete search history.

(56) References Cited

U.S. PATENT DOCUMENTS

| | | | |
|---|---|---|---|
| 2003/0112758 A1 | 6/2003 | Pang et al. | |
| 2006/0149850 A1* | 7/2006 | Bowman | G11B 27/10 709/205 |
| 2009/0262749 A1* | 10/2009 | Graumann | H04L 65/1101 370/412 |
| 2011/0167170 A1 | 7/2011 | Kovvali et al. | |
| 2013/0007223 A1 | 1/2013 | Luby et al. | |
| 2014/0280679 A1* | 9/2014 | Dey | H04L 67/568 709/213 |
| 2015/0120876 A1* | 4/2015 | Parthasarathy | H04N 21/2401 709/219 |
| 2022/0286721 A1* | 9/2022 | Tielemans | H04L 43/0841 |

FOREIGN PATENT DOCUMENTS

| | | |
|---|---|---|
| CN | 105264826 A | 1/2016 |
| CN | 106454553 A | 2/2017 |
| CN | 107810625 A | 3/2018 |
| CN | 108476333 A | 8/2018 |
| CN | 109040801 A | 12/2018 |
| CN | 110178377 A | 8/2019 |
| CN | 110248247 | 9/2019 |
| CN | 110266611 A | 9/2019 |
| EP | 1 382 143 | 1/2004 |
| EP | 2 738 994 | 6/2014 |
| EP | 3 560 207 | 10/2019 |
| JP | H0 263346 | 3/1990 |
| WO | 02/087137 | 10/2002 |
| WO | 2018/114519 | 6/2018 |

OTHER PUBLICATIONS

Colonnese, S. et al., "Affordable delay based quality selection for HTTP adaptive video streaming", 2017 IEEE International Symposium On Local and Metroploitan Area Networks (LANMAN) (2 pages).

Hossfeld, T. et al., ""Pippi Longstocking calculus for temporal stimuli pattern on YouTube QoE"", Feb. 27, 2013, Mobile Video, pp. 37-42 (6 pages).

Extended European Search Report for EP 20166787.0 dated Aug. 31, 2020 (7 pages).

Search Report Under Section 17 for GB 2004605.8 dated Sep. 21, 2010 (4 pages).

International Search Report and Written Opinion of the ISA for PCT/EP2021/056619 dated May 20, 2021 (12 pages).

Office Action dated Mar. 23, 2023 issued for Chinese Office Action 202180023767.4 (7 pages).

* cited by examiner

LOW LATENCY CONTENT DELIVERY

This application is the U.S. national phase of International Application No. PCT/EP2021/056619 filed Mar. 16, 2021 which designated the U.S. and claims priority to EP 20166787.0 filed Mar. 30, 2020, the entire contents of each of which are hereby incorporated by reference.

FIELD OF THE INVENTION

This invention relates to the field of content delivery.

BACKGROUND TO THE INVENTION

Video content is currently delivered to a range of client devices using unicast delivery, where a single stream of data is transmitted specifically for each individual client. Web (HTTP) technology is used for delivery by segmenting content into short segment files, typically six to ten seconds duration. These may be further divided into chunks, of for example 1s duration, which can start to be transmitted as soon as they are made. Typically, the client will obtain a manifest file which will allow the URLs of individual files containing video segments to be determined. The client will then request these segments in sequence and concatenate them to form a continuous stream for playback.

Each video segment may also be available at different quality levels, each at a different bit rate (and hence file size). The client device monitors its buffer level and the network throughput achieved and determines from these at which quality to request the next segment in order to achieve a good compromise between media quality and timely delivery. This technique is known as HTTP Adaptive Streaming (HAS). Examples of such techniques include Apple HTTP Live Streaming (HLS) and Microsoft Smooth-Streaming using MPEG DASH (Dynamic Adaptive Streaming over HTTP) protocol.

However, this delivery architecture can cause significant end-to-end delays, with the result that when viewing live action such as live sport, content can appear on the user's screen a significant time after the actual event occurred. By buffering data at the client device before decoding and playing it out, the probability of continuous play-out is increased (that is, the probability of data running out is reduced), but there is a consequential increase in the end-to-end delay.

SUMMARY OF THE INVENTION

It is the aim of examples of the present invention to provide an improved content delivery mechanism.

According to one example of the invention, there is provided a method of streaming media content to a client device, said media content comprising a plurality of chunks, and said method comprising:
  setting an acceptable value of the probability of play out stalling, wherein the probability of play out stalling is equal to the probability that a chunk is not delivered to the client device by the time at which it is to be played out;
  making each chunk available for delivery to the client device;
  delivering a plurality of chunks to the client device;
  measuring the delivery time of each of the plurality of chunks;
  storing the delivered chunks in a buffer at the client device until they are played out;
  playing out each chunk, wherein the playing out of a chunk starts a period of time after the time at which said chunk is made available for delivery to the client device;
  characterised in that the method further comprises
  calculating an optimum period of time using the measured delivery times and said acceptable value of the probability of play out stalling; and
  adjusting the period of time in dependence on the optimum period of time by controlling the play-out of the chunk at the client device.

The period of time is effectively the play-out delay, and can be adjusted depending on how it compares to the calculated optimum period of time. If the period of time is greater than the optimum period of time, then play-out of the chunk can be controlled at the client device to reduce the amount of content stored in the buffer. Controlling may comprise playing out the chunks at an increased rate.

However, if the period of time is less than the optimum period of time, then play-out of the chunk can be controlled at the client device to increase the amount of content stored in the buffer. Controlling may comprise playing out the chunks at a reduced rate.

The optimum period of time may be calculated using the deviation in the measured delivery times. The optimum period of time may further be calculated using the mean of the measured delivery times.

The media content may be video content.

According to a further example of the invention, there is provided a client device for streaming media content, said media content comprising a plurality of chunks, and said client device adapted to:
  set an acceptable value of the probability of play out stalling, wherein the probability of play out stalling is equal to the probability that a chunk is not delivered to the client device by the time at which it is to be played out;
  receive a plurality of chunks;
  measure the delivery time of each of the plurality of chunks;
  store the delivered chunks in a buffer until they are played out;
  play out each chunk, wherein the playing out of a chunk starts a period of time after a time at which said chunk is made available for delivery to the client device;
  characterised in that the client device is further adapted to
  calculate an optimum period of time using the measured delivery times and said acceptable value of the probability of play out stalling; and
  adjust the period of time in dependence on the optimum period of time by controlling the play-out of the chunk.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of media content delivery, where the time taken to deliver each chunk of content is measured, from which the stability or consistency of delivery times are calculated. The amount of data buffered at the user's device awaiting decoding and play-back can then be adjusted (such as by playing out the content slower or quicker), in order to achieve a good compromise between continuous play-out and low end-to-end delay, taking into consideration the current network characteristics.

Figure 1:
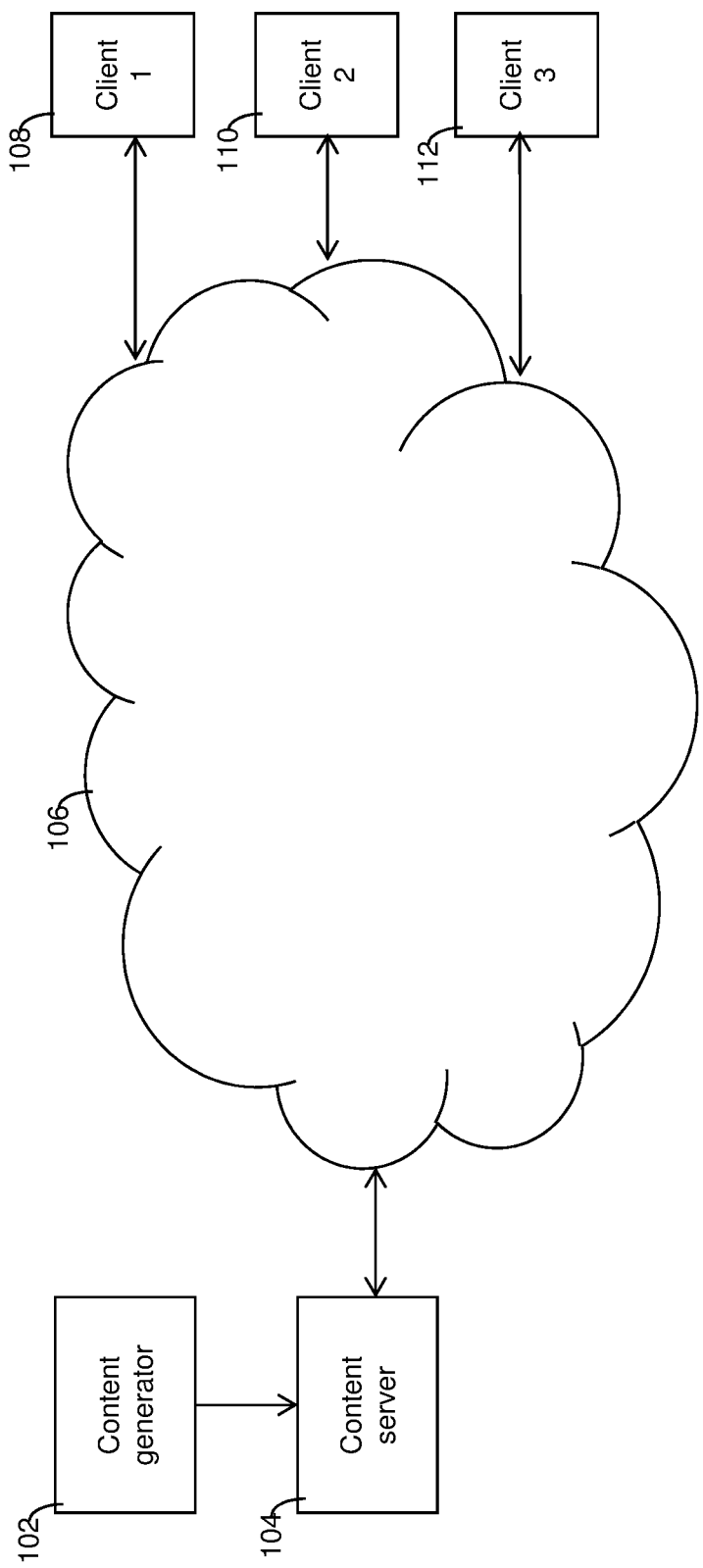
FIG. 1 is a network diagram showing a system in an example of the present invention.

FIG. 1 is a simplified network diagram showing a system 100 comprising a content generator 102 communicating with a content server 104. The content generator 102 is responsible for receiving uncompressed media content, such as live TV, and encoding and packaging the media content to pass to the content server 104. The content server 104 is responsible for storing the received media content, and, on request, delivering the content to suitably configured clients connected over the network 106. In this example, three client devices 108, 110 and 112 are shown. The clients may be video streaming clients adapted to support MPEG DASH or Apple's HLS for example. The clients are adapted to discover media content, request and process manifest files, request segments of the encoded media, and process those segments for viewing.

The content generator 102 receives media content, comprising uncompressed audio video streams, and encodes it into segments of encoded audio and video, typically 6 to 10 seconds in duration. In this example, the video encoding method used is in accordance with the ITU-T H.264 standard, though the invention is not limited to such a standard, and other encoding methods could be used instead. Similarly, the audio encoding method used is MPEG-4 HE AAC v2, though the invention is not limited to such a standard, and other encoding methods could be used instead.

The segments themselves are made up of chunks, with each chunk typically representing about 1 second of audio visual content. However, the invention is not limited to such data representations, and other data representations including segments with short duration, such as 1 second, and with content data not formatted into chunks, could be used instead. This representation with segments consisting of chunks is characteristic of the Common Media Application Format (CMAF), which can be used by the two most common HAS formats: DASH and HLS. The advantage of dividing segments further into smaller chunks, is that their delivery can start as soon as they are made and they can be played out as soon as they are received by the client device. CMAF chunks can be delivered using HTTP/1.1 Chunked Transfer to reduce transmission overhead, which allows for partial HTTP responses, meaning the client device can request a segment once and the corresponding CMAF chunks will be transmitted as soon as they become available in partial HTTP responses.

The encoded segments are passed to the content server 104, where they are stored ready for access by the client devices.

The content generator 102 also generates a metafile or manifest file describing where the segments files can be accessed (in this case, at a location on the content server 104). When using MPEG-DASH, IS 20009-1, the manifest file is referred to as an MPD (Media Presentation Description). Apple's HLS provides a manifest file in the form of a playlist file (.m3u8 file). The manifest file is also passed onto the content server 104, where it is stored ready for access by the client devices.

Figure 2:
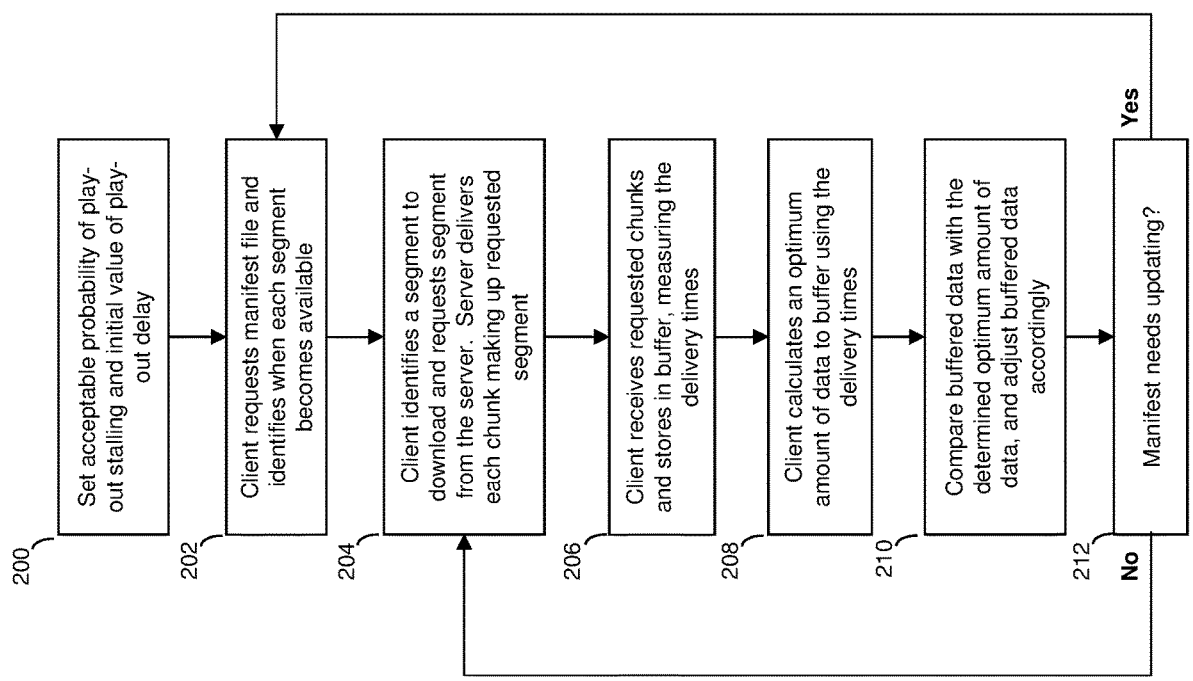
FIG. 2 is a flow chart summarising the main steps of an example of the present invention.

FIG. 2 is a flow chart summarising the general steps of an example of the invention. Each step will be described first, after which follows a more detailed discussion of the overall method.

FIG. 2 shows the steps taken at a client device to request and receive encoded media content from the content server 104, to buffer it and then play it out. While the client device is performing these steps, the content server 104 makes each encoded segment available as it receives it from the content generator 102. A manifest file stored at the content server 104 is also updated with the associated segment information when that segment becomes available at the content server 104.

In step 200, the client device 108 sets a value for an acceptable probability of play-out stalling and sets an initial value for the actual play-out delay (i.e. the initial start-up delay). Examples of how these values are set include, but are not limited to, being set by the user of the client device, being set by the content service provider, and being set in dependence on statistics gathered during previous content streaming sessions.

In step 202, the client device 108 periodically makes requests for the manifest file to identify when a segment of content is available and how to request them.

In step 204, the client device 108 identifies a segment it wishes to download, and requests the segment from the content server 104, which responds by delivering sequentially each chunk that makes up the segment. For example, when using HTTP/1.1 Chunked Transfer, if the requested segments contain chunks, then each chunk is pushed to the client device as they become available if the complete segment is not fully available (not all chunks available). However, if a requested segment is fully available (all chunks are available), then the entire segment is delivered.

In step 206, the client device 108 starts receiving the chunks, and buffers them in a local data store ready for decoding and playout. The client device 108 also monitors how long it takes to receive each chunk and determines further delivery time statistics.

In step 208, the client device 108 uses the chunk delivery time statistics to determine an appropriate or optimum amount of data to maintain in the buffer. The optimum amount of data can be represented as an optimum period of time or an optimum play-out delay, and calculated to minimise end-to-end delay while satisfying conditions on the likelihood of running out of data to decode and play-out (i.e. the probability of playout stalling), which would lead to a stall in the presentation of content to the user.

In step 210, the client device 108 compares the determined optimum amount (or period of time) of data to buffer to the actual amount (or period of time) of data buffered at the client device, and adjusts the handling of the buffered data accordingly.

For example, if the amount of amount of data actually buffered is less than the optimum amount of data, the client device can take action to increase the amount of data buffered, while maintaining continuous play-out of content.

Such action could include playing the content slower than its intended play-out speed, such as 4% slower than intended.

However, if the amount of data actually buffered is greater than the optimum amount of data to be buffered, the client device can take action to reduce the amount of data buffered, while maintaining continuous play-out of content. Such action could include playing the content faster than its intended play-out speed, such as 4% faster than intended, and could also or instead include not presenting some parts of the content at all, particularly if some of the content has been marked as being of lower importance or interest to the viewer. This would result in a reduction in the end-to-end delay.

In step 212, a check is made to determine if the manifest needs to be updated. If the manifest does need updating, then processing passes back to step 202, otherwise processing passes back to step 204. For example, HLS requires the .m3u8 manifest file to be reloaded after each segment is requested, whereas with DASH it is usually only necessary to load the MPD manifest file just once.

An example of the statistics on chunk delivery time include, but are not limited to, the mean delivery time and the standard deviation. They may also include maintaining a histogram or a probability density function for the chunk delivery times. This will be described in more detail later.

The optimum amount of data to buffer can be determined from the determined chunk delivery time statistics and a threshold set for the probability of running out of data to decode and play out, resulting in play-out stalling. The probability of running out of data can also be defined as the probability that a chunk is not delivered to the client device by the time at which it is to be played out. This could be performed for example by using a predetermined function of the mean and standard deviation of chunk delivery time, a look-up table of these parameters, or could involve running a Monte-Carlo type simulation using the actual recorded chunk delivery times, or using chunk delivery times sampled from a smoothed probability density function determined from the actual recorded chunk delivery times. This determination of the optimum amount of data to be buffer will be explored in more detail later.

Figure 3:
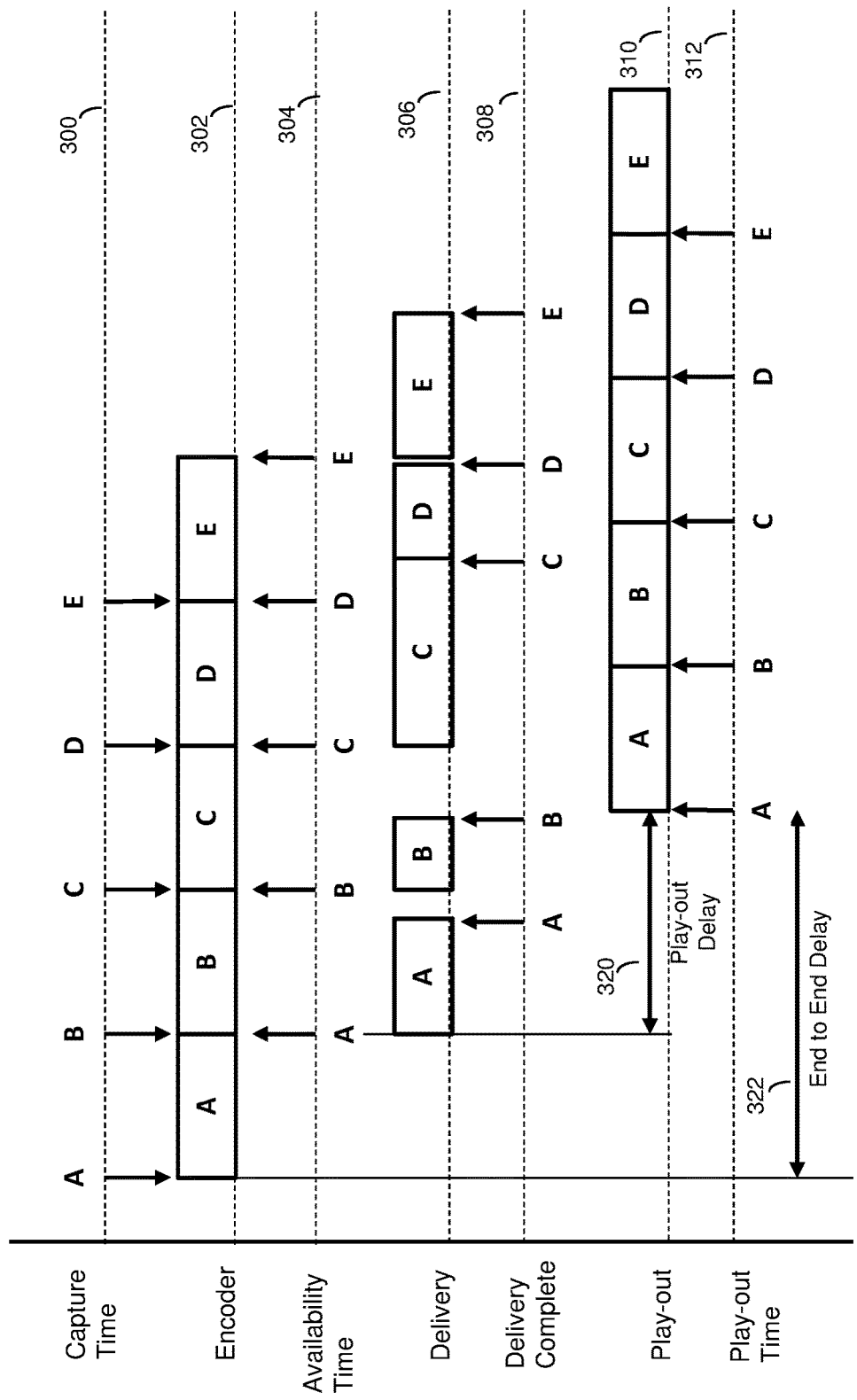
FIG. 3 is a timing diagram illustrating content delivery in an example of the present invention.

FIG. 3 shows a first example of the timing of chunks during encoding, delivery, buffering and play-out in which each chunk has the same play-out duration. Note, time increases from left to right in the figure.

Media content is made available continuously at the input to the encoder at the content generator 102. The encoder encodes the media content, and formats it into chunks as described above. The time at which content from a chunk (A, B, C, D and E) starts to enter the encoder is shown on axis 300 labelled "Capture Time". As soon as a chunk is completely encoded, see completed chunks A, B C, D and E on axis 302 labelled "Encoder", it is passed to the content server 104 and is made available for the client device to request the delivery of it. This is shown on axis 304 labelled "Availability Time". The client device requests the delivery of a chunk as soon as it is made available, or as soon as the delivery of the previous chunk has been completed, whichever is later. Delivery is shown on axis 306, and completed delivery marked on axis 308. For example, delivery of chunk A starts immediately (see start of chunk A on axis 306) after it is made available (see label A on axis 304), and similarly for chunk B, but for chunk D, delivery starts straight after chunk C has been delivered.

The time taken to deliver a chunk is variable, dependent on the network conditions. Chunk A is shown to be delivered in less than a chunk period, and hence delivery of chunk B cannot start until it is available. Chunk B is delivered even quicker, and hence delivery of chunk C cannot start until it is available.

Chunk C takes longer than a chunk period to be delivered. Consequently, in this case, the client device has chosen not to start delivery of chunk D until chunk C is fully downloaded. It could have started a parallel download of chunk D, but this would probably cause the download of chunk C to take even longer, and increase the risk of play-out stalling.

Chunk D is delivered in less than a chunk period, and sufficiently quickly that the client device must wait until chunk E is available before starting delivery.

FIG. 3 shows one choice for a setting of the end-to-end delay 322, where the end-to-end delay is the time between when a chunk is input into the encoder and the time play out of that chunk starts. While play-out could have started as soon as chunk A had been downloaded, it would have been necessary for every subsequent chunk to have been delivered as quickly as chunk A to avoid play-out stalling. Instead, FIG. 3 shows play-out of chunk A starting 2.55 chunk periods after its capture time, 1.55 chunk periods after it was first available for download, and 0.75 chunk periods after it was fully downloaded. The end-to-end delay with this setting of play-out delay is therefore 2.55 chunk periods, with the first media content of chunk A being played-out 2.55 chunk periods after the same media content was input to the encoder.

The play-out delay for a chunk is the time between the availability time for the chunk, as shown on axis 304, and the play-out time for the chunk as shown on axis 312. FIG. 3 shows each chunk having the same play-out delay 320, including chunk D whose actual delivery starts after its availability time, because the play-out duration is the same for each chunk.

With this setting of play-out delay, even chunk C, which takes 1.3 chunk periods to be delivered, is fully delivered 0.25 chunk periods before it is needed for play-out, and so play-out does not stall.

Figure 4:
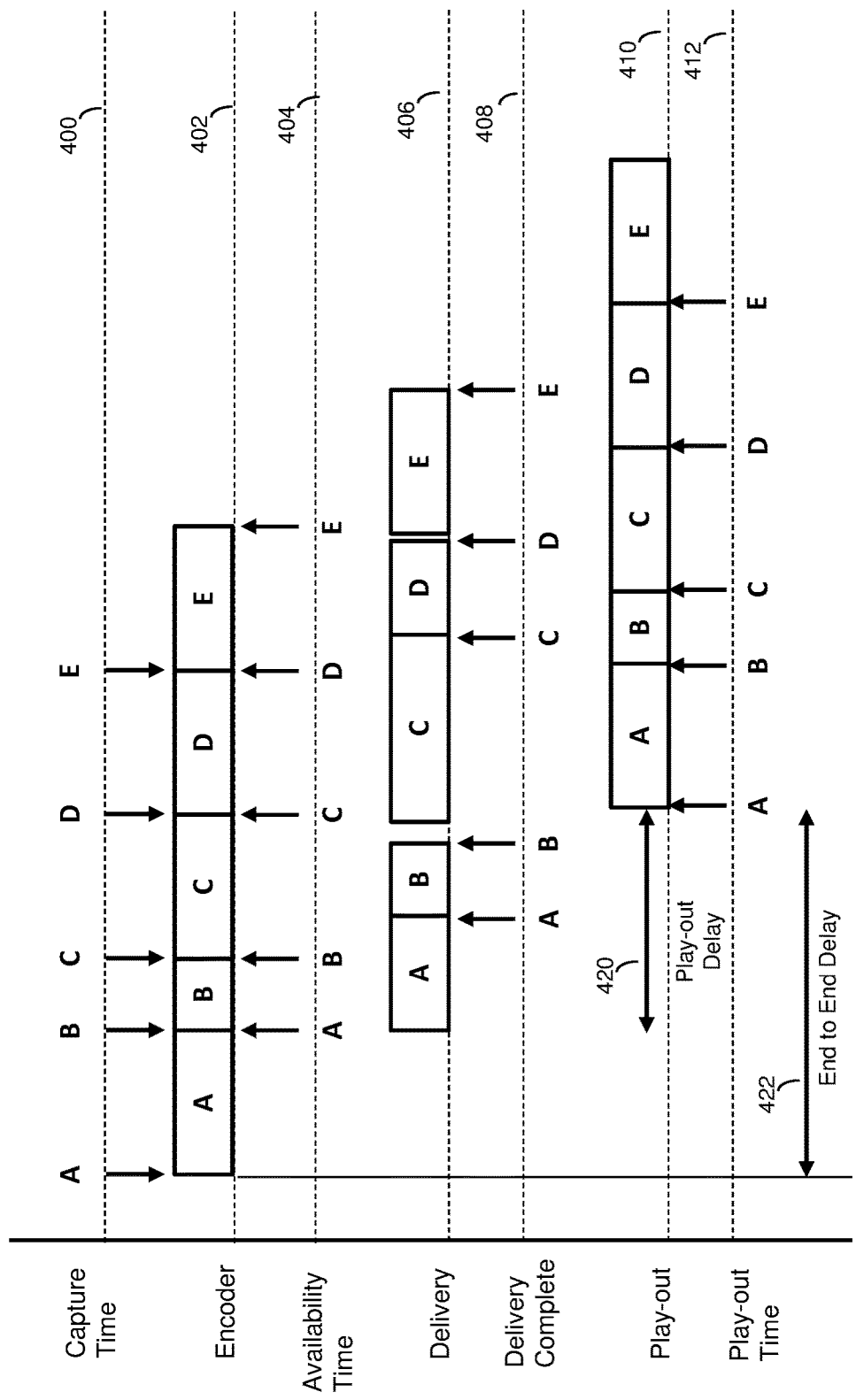
FIG. 4 is a timing diagram illustrating content delivery in another example of the present invention.

FIG. 4 shows a second example of the timing of chunks during encoding, delivery, buffering and play-out in which each chunk does not have the same play-out duration: chunk B is shown to have a shorter play-out duration than the other chunks. The encoder may choose to create chunks with different play-out durations for a variety of reasons, including aligning chunk boundaries to scene changes in the content, aligning chunk boundaries to the end of a programme, and to allow the insertion of advertising content into programme content.

Processing content as chunks, when each chunk does not have the same play-out duration, causes an irregular pattern in the capture times, availability times and play-out times for the chunks. Although the same irregular pattern occurs for the capture times on axis 400 and play-out times on axis 412 of chunks while the end-to-end delay remains constant, the same irregularity does not occur for the availability times of chunks on axis 404. In the example shown in the FIG. 4, chunk B is made available soon after chunk A as it is short and encoded quickly, but its play-out starts one normal chunk duration after chunk A starts to play out as chunk A has normal play-out duration. So in this case, the play-out delay is not the same for each chunk as the time between a chunk becoming available and the chunk starting to be played-out is not the same for all chunks, but the time between a chunk starting to be encoded at its capture time and starting to be played-out at its play-out time remains constant and equal to the end-to-end delay 422. Further-more, the end-to-end delay 422 for each chunk is equal to the sum of its play-out delay 420 and its play-out duration.

Figure 5:
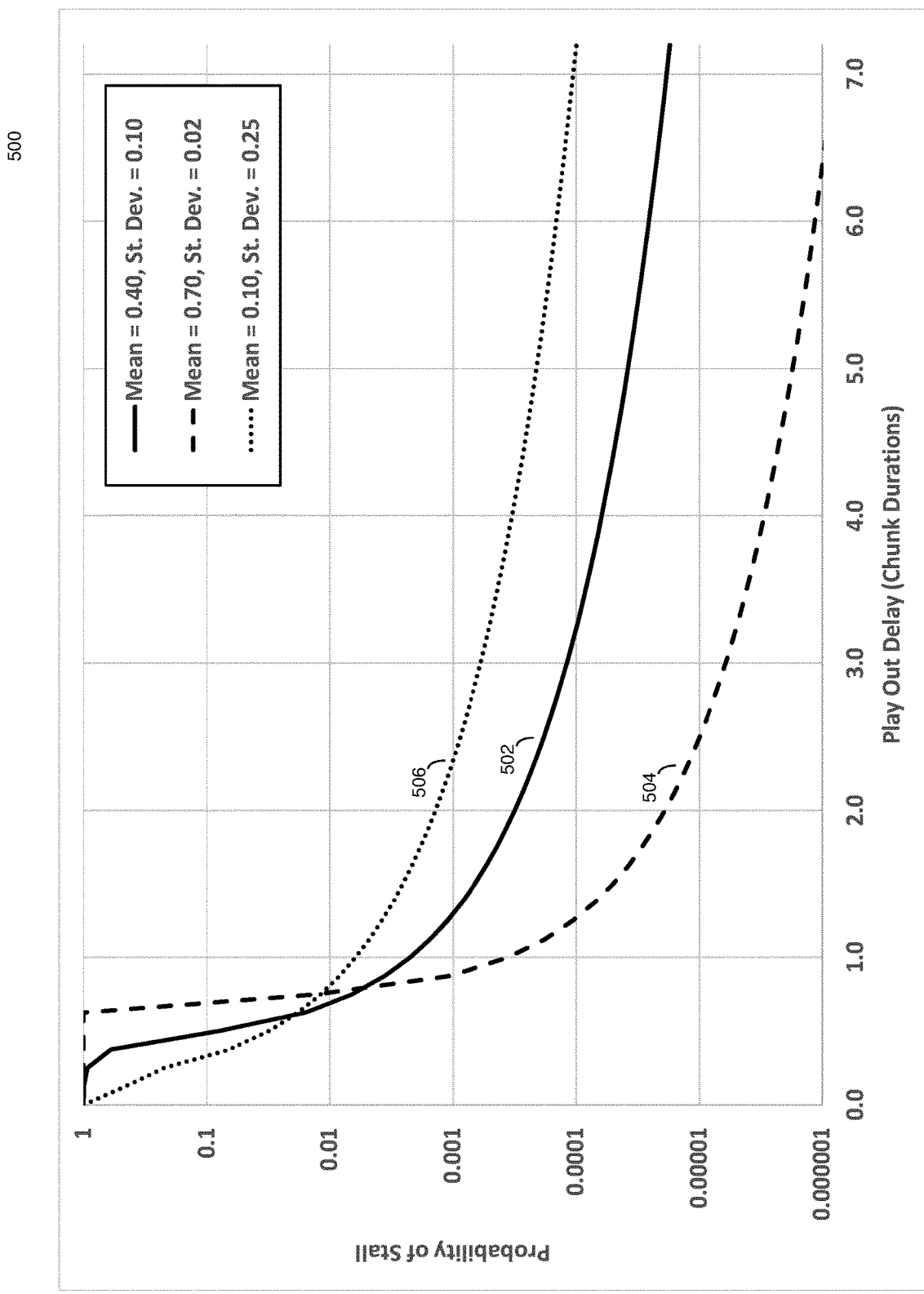
FIG. 5 is a graph showing how the probability of play-out stalling varies with the play-out delay in examples of the present invention.

FIG. 5 shows a graph of how the probability of play-out stalling (y-axis) could vary with the play-out delay (y-axis) for different values of mean and standard deviation of chunk delivery times. To simplify the description, the chart is described as though all chunks have the same play-out duration, although as stated above, this may not always be true.

The solid line 502 shows the relationship for a mean chunk delivery time of 0.40, that is, 40% of a chunk play-out time, where the standard deviation is 0.10. The play-out delay needs to be set to 3.23 chunk periods to achieve a probability of stall of 0.0001.

The dashed line 504 shows the effect of a higher mean chunk delivery time of 0.70 (70% of a chunk play-out time), but where the standard deviation is only 0.02, a lower value indicating greater stability of network throughput. In this case, the play-out delay needs to be set to only 1.27 chunk periods to achieve a probability of stall of 0.0001.

The dotted line 506 shows the effect of a lower mean chunk delivery time of 0.10 (10% of a chunk play-out time), but where the standard deviation is 0.25, a higher value indicating less stability of network throughput. In this case, the play-out delay needs to be set to 7.17 chunk periods to achieve a probability of stall of 0.0001.

This illustrates that the probability of a stall can be controlled by setting the play-out delay according to the measured statistics of the chunk delivery times, and that the variation of the chunk delivery times can be a more important factor to consider than the mean chunk delivery time.

In the case where each chunk does not have the same play-out duration, the statistics of chunk delivery time are used to set the end-to-end delay, that is, the time between content being captured and the same content being played-out at the client device.

In order to be able to adjust the play-out delay or the end-to-end delay to try to achieve the acceptable probability of play-out stalling, statistics are gathered for the delivery times of chunks, and processed to determine the appropriate delay. The following is one example of the type of statistics that could be gathered and a method by which they could be processed.

The time taken for the delivery of each chunk is recorded, the time taken being the period of time between delivery of a chunk starting, axis 306, and delivery of a chunk finishing, axis 308. If the chunks have different size in terms of bytes, then the delivery time for a chunk is normalised by scaling to determine a delivery time for a reference size of chunk.

The normalised delivery times for recently delivered chunks, for example, the chunks delivered in the preceding period of 30 s, are processed to determine the mean and standard deviation of the chunk normalised delivery times.

A cumulative distribution function is defined using these calculated values of mean and standard deviation of the normalised chunk delivery times that indicates the probability of a normalised chunk taking longer than a specified time for delivery.

One possible cumulative distribution function is the well-known Gaussian distribution, in which, for example, the probability of a sample being more than three standard deviations above the mean is about 0.0013 and of being more than five standard deviations above the mean is about 0.00000029.

However, the Gaussian may not be a good model for the distribution of normalised chunk delivery times, as the distribution often has a long or heavy tail, indicated by a large value of kurtosis. A cumulative distribution function defined as an inverse square function for samples above the mean may often be more appropriate. An example is given in equation (1) below, where p(t) is the probability of delivery taking longer than time t, which is expressed as a time period normalised by the chunk play-out duration, and where p is the mean and a is the standard deviation of the chunk normalised delivery times:

$$p(t) = \frac{0.08\sigma^2}{(t-\mu)^2} \quad (1)$$

The equation would only be used for values of t above the mean, μ, and in particular for larger values of t, such as: t≥μ+σ/2.

In this case, the probability of a sample being more than three standard deviations above the mean is about 0.0089 and of being more than five standard deviations about the mean is about 0.0032. It can be seen that with the Gaussian distribution the probability of being more than five standard deviations about the mean is insignificant, the same is not true with an inverse square function.

The following is an example of how to calculate an optimum amount of data to be buffered, or as will be described here in terms of time, an optimum play-out delay using the measured delivery times and the acceptable probability of play-out stalling.

The delivery times for preceding chunks are normalised by scaling in proportion to the ratio of a reference size of chunk to the actual size of the chunk measured in bytes. The mean and the standard deviation of these normalised delivery times are calculated. If chunks have 1 s play-out duration, and analysis is performed over the preceding 30 s, then 30 normalised delivery times will be used in the calculation.

In this example, the acceptable probability of play-out stalling has been set to 0.0001. This would mean that on average 10,000 chunks could be delivered and presented on time before a stalling event occurs.

In Equation (1) above, when t is set to the play-out delay, p(t) is the probability that delivery takes longer than the play-out delay, and hence is the probability of stalling. Hence by setting p(t) to the acceptable probability of play-out stalling, $p_s$, t becomes the optimum play-out delay (or period of time), $t_{opo}$.

Equation (1) can then be re-arranged to allow $t_{opo}$ to be determined from the mean μ, the standard deviation σ, and the acceptable probability of play-out stalling, $p_s$ to give:

$$t_{opo} = \mu + \sigma\sqrt{\frac{0.08}{p_s}} \quad (2)$$

The table below shows the value of t, the optimal play-out delay, for the three sets of values of mean and standard deviation shown in the graph above, expressed in terms of chunk play-out durations.

| Mean and Standard Deviation | Optimum play-out delay |
|---|---|
| μ = 0.40; σ = 0.10 | 3.23 |
| μ = 0.70; σ = 0.02 | 1.27 |
| μ = 0.10; σ = 0.25 | 7.17 |

This shows that when the variation (standard deviation) is lower, the optimal play-out delay can be lower, even though the mean delivery time may be higher.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of streaming media content to a client device, said media content comprising a plurality of chunks, and said method comprising:
setting an acceptable numerical value of the probability of play out stalling, wherein the probability of play out stalling is equal to the probability that a chunk is not delivered to the client device by a time at which it is to be played out;
making each chunk available for delivery to the client device;
delivering a plurality of chunks to the client device;
measuring a delivery time of each of the plurality of chunks;
storing the delivered chunks in a buffer at the client device until they are played out;
playing out each chunk, wherein the playing out of a chunk starts a period of time after a time at which said chunk is made available for delivery to the client device;
calculating an optimum period of time using the measured delivery times and said acceptable numerical value of the probability of play out stalling; and
adjusting the period of time in dependence on the optimum period of time by controlling the play-out of the chunk at the client device;
wherein the acceptable numerical value of probability of the play out stalling is a numerical value greater than zero.

2. A method according to claim 1, further comprising: determining that the period of time is greater than the optimum period of time, and in response to the determining, controlling the play-out of the chunk at the client device to reduce the amount of content stored in the buffer.

3. A method according to claim 2, wherein controlling comprises playing out the chunks at an increased rate.

4. A method according to claim 1, further comprising: determining that the period of time is less than the optimum period of time, and in response to the determining, controlling the play-out of the chunk at the client device to increase the amount of content stored in the buffer.

5. A method according to claim 4, wherein controlling comprises playing out the chunks at a reduced rate.

6. A method according to claim 1, wherein the optimum period of time is calculated using a deviation in the measured delivery times.

7. A method according to claim 1, wherein the optimum period of time is calculated using a mean of the measured delivery times.

8. A method according to claim 1, wherein the media content is video content.

9. The method according to claim 1, wherein the optimum period of time is calculated using a predetermined function of a mean and standard deviation of the measured delivery times.

10. The method according to claim 1, wherein the optimum period of time is calculated using a Monte-Carlo type simulation using the measured delivery times, or using chunk delivery times sampled from a smoothed probability density function determined from the measured delivery times.

11. A method according to claim 1, further comprising comparing the period of time to the optimum period of time;
as result of the period of time being greater than the optimum period of time in the comparing of the period of time to the optimum period of time, playing out the chunks at an increased rate to reduce the amount of content stored in the buffer; and
as result of the period of time being less than the optimum period of time in the comparing the period of time to the optimum period of time, playing out the chunks at a reduced rate to increase the amount of content stored in the buffer.

12. A client device for streaming media content, said media content comprising a plurality of chunks, and said client device adapted to:
set an acceptable numerical value of the probability of play out stalling, wherein the probability of play out stalling is equal to the probability that a chunk is not delivered to the client device by a time at which it is to be played out;
receive a plurality of chunks;
measure a delivery time of each of the plurality of chunks;
store the delivered chunks in a buffer until they are played out;
play out each chunk, wherein the playing out of a chunk starts a period of time after a time at which said chunk is made available for delivery to the client device;
calculate an optimum period of time using the measured delivery times and said acceptable numerical value of the probability of play out stalling; and
adjust the period of time in dependence on the optimum period of time by controlling the play-out of the chunk;
wherein the acceptable numerical value of probability of the play out stalling is a numerical value greater than zero.

13. The client device according to claim 12, wherein the client device is further adapted to determine that the period of time is greater than the optimum period of time, and in response to the determination, control the play-out of the chunk at the client device to reduce the amount of content stored in the buffer.

14. The client device according to claim 13, wherein the control of the play out comprises playing out the chunks at an increased rate.

15. The client device according to claim 12, wherein the client device is further adapted to determine that the period of time is less than the optimum period of time, and in response to the determination, control the play-out of the chunk at the client device to increase the amount of content stored in the buffer.

16. The client device according to claim 15, wherein the control of the play out comprises playing out the chunks at a reduced rate.

17. The client device according to claim 12, wherein the optimum period of time is calculated using a deviation in the measured delivery times.

18. The client device according to claim 12, wherein the optimum period of time is calculated using a mean of the measured delivery times.

19. The client device according to claim 12, wherein the optimum period of time is calculated using a predetermined function of a mean and standard deviation of the measured delivery times.

20. The client device according to claim 12, wherein the optimum period of time is calculated using a Monte-Carlo type simulation using the measured delivery times, or using chunk delivery times sampled from a smoothed probability density function determined from the measured delivery times.

21. The client device according to claim 12, wherein:
the client device is further adapted to compare the period of time to the optimum period of time;
as result of the period of time being greater than the optimum period of time in the comparison of the period of time to the optimum period of time, playing out the chunks at an increased rate to reduce the amount of content stored in the buffer; and
as result of the period of time being less than the optimum period of time in the comparison of the period of time to the optimum period of time, playing out the chunks at a reduced rate to increase the amount of content stored in the buffer.

* * * * *